2,926,388

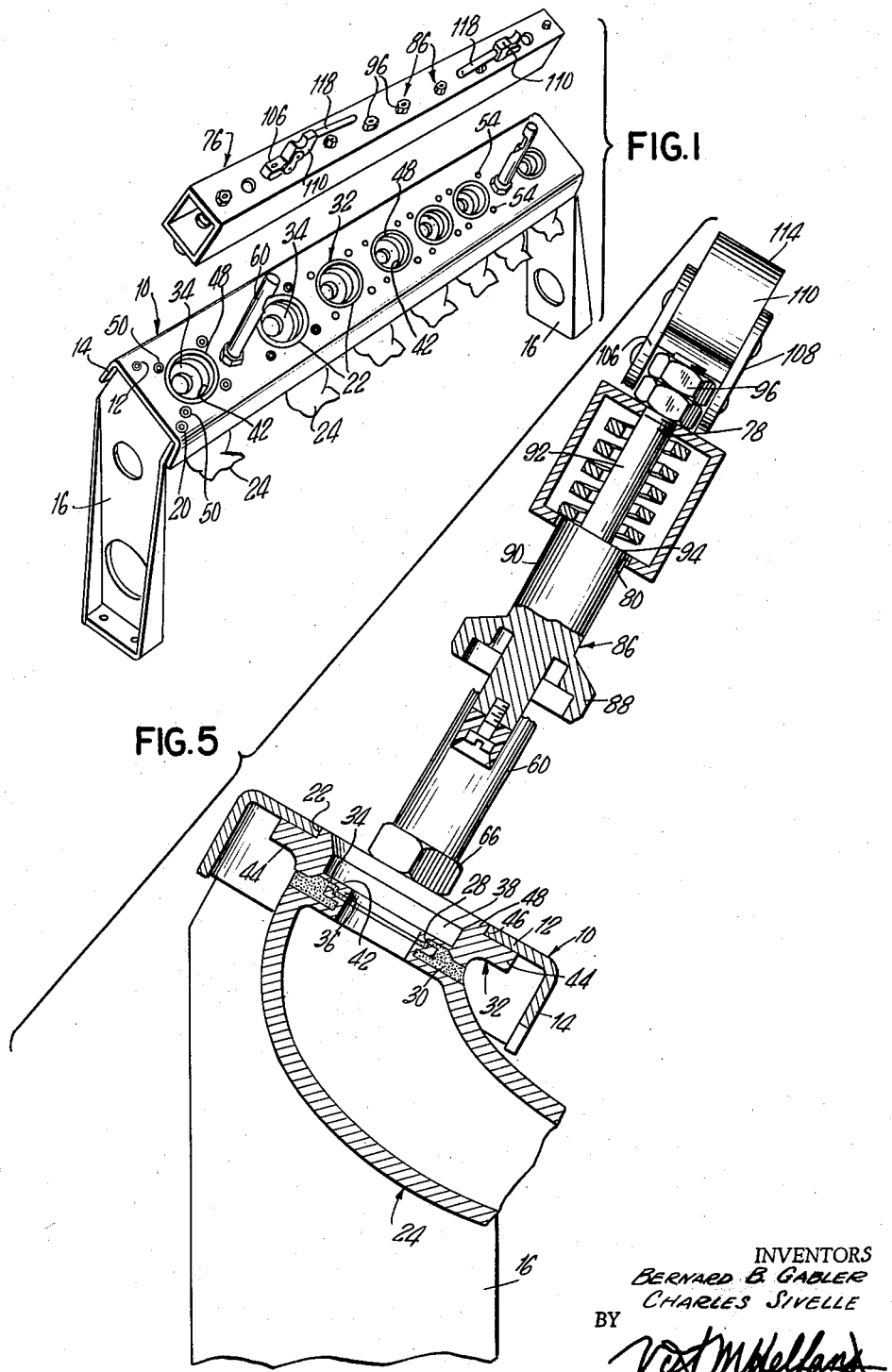

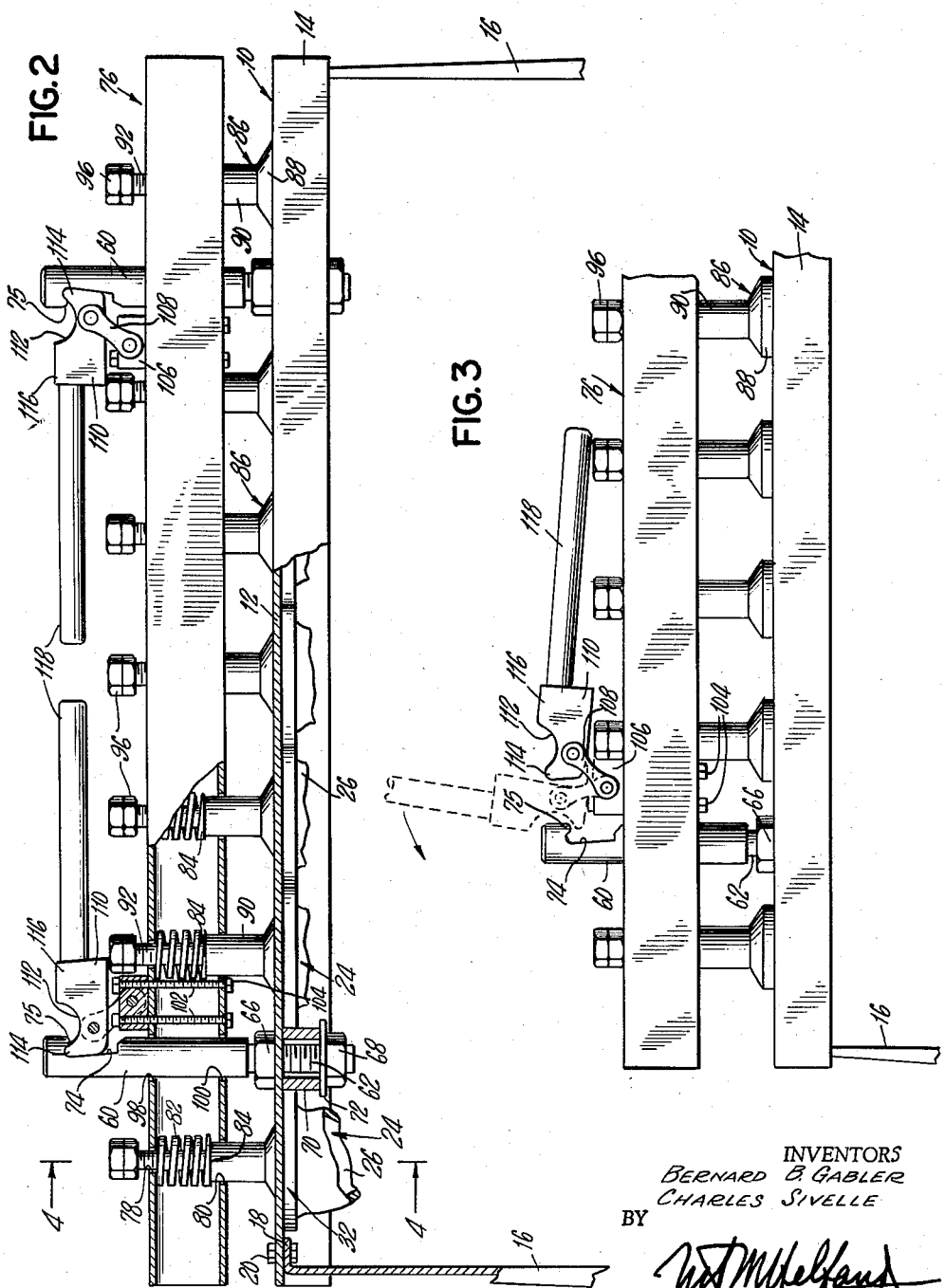

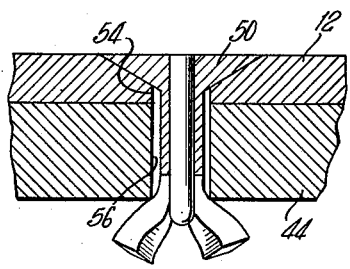
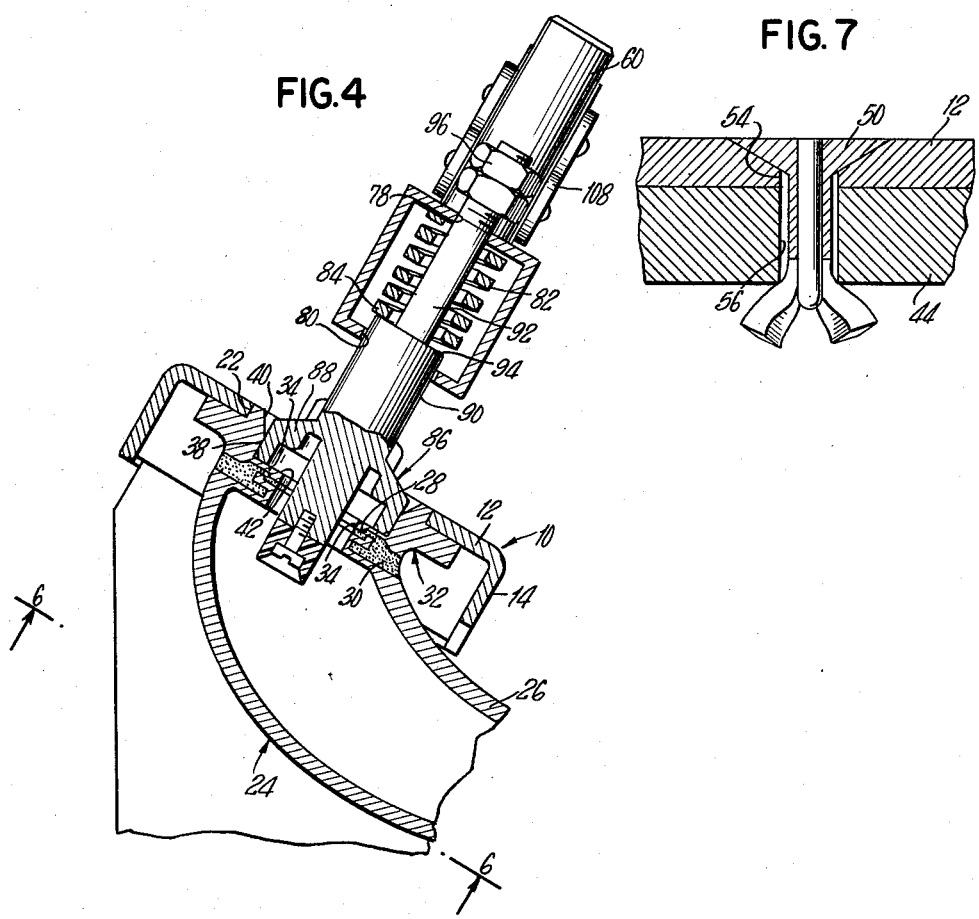
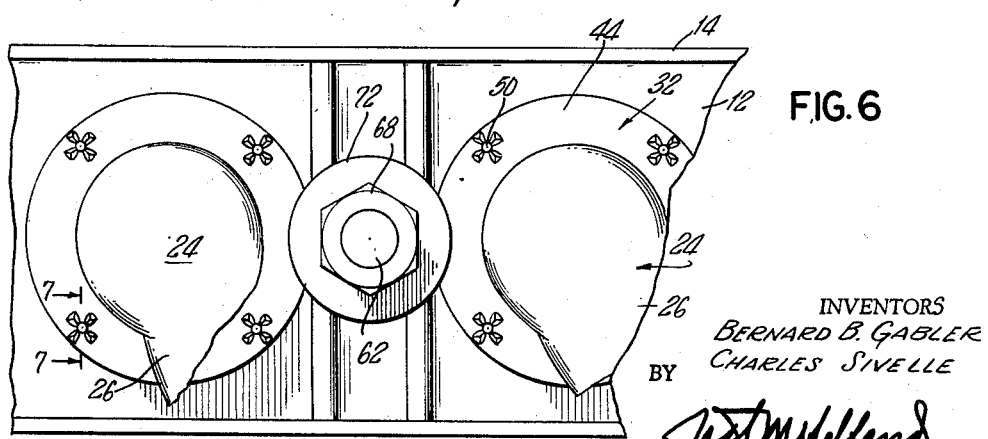
INVENTORS
BERNARD B. GABLER
CHARLES SIVELLE

MOLD AND FRAME ASSEMBLY

Bernard B. Gabler, New York, and Charles Sivelle, New Hyde Park, N.Y.

Application June 17, 1958, Serial No. 742,672

14 Claims. (Cl. 18—43)

The present invention relates to a mold supporting frame, and particularly to a frame for supporting a plurality of molds of the type used in the rotation or slush molding of hollow objects from a plastic polyvinyl resin, such as polyvinyl chloride or the like, as doll body members or the like, for instance.

In the rotation or slush molding of such plastic bodies, a mold which is open at one end is filled with a predetermined amount of the desired liquid resin, its opening is then tightly closed and it is immersed and agitated in a heated fluid medium, such as a heated liquid or heated air, for a sufficient time to have the resin polymerize or cure and set on the walls of the mold cavity. After the molded body is set, the closure is removed and it is stripped from the mold.

In commercial practice, a plurality of such molds are generally secured to a supporting frame member or strap and a plurality of corresponding mold caps or closures are secured to a cooperating frame member or lock bar. Such lock bar, with the individual closures fitted into the corresponding mold openings, is locked under spring tension on the strap by toggle locks. The foregoing assembly, with all its molds pre-filled with resin, is immersed and agitated in the curing fluid as a unit, to effect the simultaneous, economic formation of a plurality of molded bodies.

As the curing of the resin requires relatively high temperatures of up to 700° F., high pressure is generated within the several molds by the expansion of the air trapped therein under the curing heat. The combined pressures of the several molds on the frame is exerted, through their closures, to push the strap and lock bar away from one another, and, unless the supporting strap and lock bars are of sufficient rigidity, will distort either one or both of them, to thereby disturb the close fit of the closures, thus creating leaks and making the supporting frame assembly unfit for further use.

In the mold supporting frames as made according to the prior art, the rigidity of the strap member is attained by forming it of two spaced, parallel metal strips, formed with drilled-out registering mold receiving openings and connected to one another by brace bars at their ends and also, generally, between each pair of registering mold receiving openings. The straps thus formed generally require supports of legs not only at their ends but at numerous points between their ends. In spite of this reinforced structure, which makes the production of such straps laborious, time consuming and costly and results in a strap of relatively great weight, they, nevertheless, frequently yield to the curing pressures and temperatures, to buckle, become distorted and spring leaks.

The lock bars of the mold supporting frames, as heretofore made, consist of a strip of metal with drilled holes through which guide posts of the mold closures are inserted. Each post is capped at its end to be thereby retained on the bar, and a spring is interposed around the post intermediate the inner face of the bar and a shoulder formed on the post, to thereby maintain the closure proper in spaced relation to the bar. The lock bar also has additional holes bored therethrough, generally at each end and at a number of points intermediate the ends, which fit over lock posts set on the upper member of the strap. These posts are each formed with a notch engageable by a toggle mounted and operated latch on the upper face of the lock bar. Thus, when the lock bar is slipped over the locking posts and the closures are fitted in their respective mold openings, and the toggle locks moved to engage in the lock post notches, the bar is moved toward the strap, to exert substantially uniform pressure on each spring to press the associated closure into sealing position within its opening mold.

Such prior art lock bar construction, especially when used with the prior art strap construction, requires the provision of locking devices at numerous points on the frame, to provide adequate uniform pressure on the closures and to prevent the buckling of either the strap or the frame, or both. Obviously, the provision of such extra locking means is costly and adds a great deal to the weight of the mold supporting frame and also takes time to manipulate. Further, the springs on the lock bar of the prior art are completely exposed and unshielded from the elements, the molding material and other dirt, which tend to clog them, and from the curing heat which tends to soften them and reduce their effectiveness.

It is the general object of the present invention, therefore, to provide mold supporting frame assemblies of the character described in which the foregoing disadvantages and shortcomings are substantially reduced, if not entirely eliminated, and which possess additional advantages and superiorities over such prior art frame assemblies.

It is, thus, one object of the present invention to provide a mold supporting frame of the character described having a strap formed of a single thickness of material and is yet of greater rigidity than the straps of the prior art mold frames and require a lesser number of supports, to thereby materially reduce the cost and weight of the frame assembly and greatly facilitate its handling and manipulation.

It is another object of the present invention to provide a mold frame assembly of the character described having a strap member which is more easily and rapidly fabricated because of its one piece construction which is easy to shape, and also permits of the simultaneous formation of all of the mold and other openings therein by a single die punching operation.

It is also an object of the present invention to provide a mold frame assembly of the character described having a strap member which permits the securing of the mold thereto by expansion rivets which may be easily set into place and easily removed, for the replacement of the molds on the strap, when required, in place of the costly time consuming and hard to remove brazing of similar mold attaching means heretofore utilized.

It is a further object of the present invention to provide a mold frame assembly of the character described having a lock bar which is likewise of increased rigidity, to thereby make possible, in association with the more rigid strap member, the reduction in the number of locks required to hold the mold closures in place, and also thereby additionally reduce the relative weight of the mold frame, and its cost of production, and greatly facilitate its use and manipulation.

It is a still further object of the present invention to provide a mold frame assembly of the character described having a lock bar member on which the pressure springs for the mold closures are mounted in covered position, to shield them from contamination and clogging by dirt and the molding material as well as against the excessive heat of the curing temperatures, to thereby preserve them and their effective rigidity and render them more durable and more effective.

The foregoing and other objects and advantages of the mold supporting frames of the present invention will become more readily apparent to those skilled in the art from the embodiment thereof shown in the accompanying drawing and from the description following. It is to be understood, however, that such embodiment is shown by way of illustration only, to make the principles and practice of the invention more readily comprehensible, and without any intent of limiting the invention to the specific details therein shown.

In the drawings:

Fig. 1 is a perspective view of a mold frame assembly of the present invention; shown in disassembled state;

Fig. 2 is a front elevation of the same on an enlarged scale, in fully assembled and locked position, partly broken away and tilted rearwardly to more clearly show structural details;

Fig. 3 is a fragmentary front elevation of the assembly of Fig. 2; shown in assembled but unlocked position; the broken lines showing a position of the latch in readiness for either opening the molds by moving in the direction of the arrow, or for locking the assembly by moving in the opposite direction;

Fig. 4 is a fragmentary, sectional and partly elevational view taken on line 4—4 of Fig. 2;

Fig. 5 is a similar view taken on a similar line in Fig. 3, partly broken away for clarity;

Fig. 6 is a section taken on line 6—6 of Fig. 4; and

Fig. 7 is a section taken on line 7—7 of Fig. 6.

Referring now in greater detail to the mold frame of the invention illustrated in the accompanying drawing, the same is shown to comprise a strap or mold support, generally designated as 10, formed of a simple strap of relatively heavy, rigid sheet steel, or the like, which is bent to form an elongated platform or table 12, with integral, depending stiffening and reinforcing flanges 14. The platform 12 is conventionally supported, at an angle to the horizontal, by legs 16, at each end, which legs are likewise preferably formed of sheet steel suitably shaped and bent to provide rigid support for the strap 10, and secured to the strap in any suitable desired manner as by the offsets 18, which are secured to the platform 12 by bolts and nuts 20.

The platform 12 is provided with a plurality of preferably regularly spaced mold openings 22, arranged in a row, which may, if desired, be simultaneously die-cut or punched from the strap 10. Around each of the openings 22 there is secured, preferably from the underside, a mold, generally designated as 24. Each of the molds 24 comprises, preferably, an electro-deposited, mold body 26, of any desired shape, form and size, having an open end in the edge of which is preferably formed a rabbet 28. The mold body 26 is secured as by brazing 30, to a metallic, preferably brass ring 32, having an inner flange 34, which is preferably flat and is formed with a centering lip 36, that fits into the rabbet 28, to facilitate the accurate association of the ring 32 with the mold body 26. The ring 32 is preferably of substantial thickness and has an annular inner cylindrical wall portion 38, surrounding the flange 34, terminating in an outer bevel 40; the wall and flange 38 and 34 forming a seat, generally designated as 42 for a cap closure, which will hereafter be more fully described.

The ring 32 is formed, at its upper end, with an outwardly, laterally extending flange 44, of greater area than mold opening 22 in the strap 10, and is formed with a rabbet 46, on its upper surface defining an annular boss 48, which fits closely into a mold opening 22 in the strap 10, while the surrounding flat portion of the ring flange 44 underlies the marginal edge portions of a mold opening 22. Because of the single sheet construction of the strap 10, the ring 32, instead of being soldered, welded or brazed to the strap 10, as heretofore practiced, may be riveted in place as by expansion rivets 50. Such rivets may be easily applied and may be relatively easily stripped when it is desired to remove the supported mold, without damage either to the mold or strap. This manner of securing the mold 26 to the strap 10 may be easily and rapidly accomplished by simultaneously punching out, by a suitable multiple punch die, a plurality, such as four, of rivet openings 54, in the strap 10, around the mold opening 22, and also punching out with the same or similar multiple punch die, corresponding openings 56, in the ring flange 44, and securing the expansion rivets of the type well known in the art, within each pair of registering openings 54 and 56, as clearly shown in Figs. 6 and 7.

The strap 10 is provided with conventional upstanding guiding posts, generally designated as 60, which, because of the enhanced rigidity of the strap 10 and of the associated lock bar, which will hereafter be described in detail, need not exceed two in number, in most instances. Each such post 60 is formed with a reduced, threaded end 62, which is inserted through a suitable opening formed in the strap platform 12, and is adjustably held in place, as by nut 66, threaded on the post end 62 above the platform 12 and the nut 68 threaded thereon from below. Preferably, transverse reinforcing ribs 70, are provided on the underside of platform 12, one to each side of each opening 64, approximately the height of flanges 14, and the reduced post end 62 extends and is engaged by nut 68 below such ribs 70, with a suitable washer 72, interposed between nut 68 and ribs 70. Because of the spacing between the nuts 66 and 68 thus attained, a steady and rigid support is provided for the guide posts 60.

Each of the posts 60 is provided on its thicker end, above platform 12, with a detent notch 74, having a dependent nose 75, and the posts 60 are disposed with their notches 75 facing, in the conventional manner.

The lock bar of the mold frame of the invention comprises a tubular body 76, of preferably rectangular cross-section and coextensive in length with the strap 10. The tubular body 76 is formed with a series of spaced, registering and concentrically arranged openings 78 and 80, respectively, in its upper and lower walls; preferably with opening 80, in the lower wall, of greater size than opening 78 in the upper wall. The spacing between the centers of adjacent pairs of openings 78 and 80 is arranged to equal the spacing between the centers of adjacent mold openings 22 in the strap platform 10.

Disposed within the tube 76, intermediate the upper and lower walls thereof, around each pair of openings 78 and 80, is a coil spring 82, whose uppermost coil is of an inner diameter greater than that of the opening 78, and whose lowermost coil is of an outer diameter greater than the diameter of the opening 80 and of an inner diameter less than the diameter of the opening 80, so that the lowermost coil, 84, of the spring partly overlaps the edge of the opening 80. Such spring formation may best be obtained by forming the bottom coil 84 of the spring at right angles to the longitudinal axis thereof and of flattening the same to increase its lateral thickness. Such springs 82 are preferably inserted in place in partly compressed state and under tension.

Supported on the lock bar are a plurality of mold closures, generally designated as 86, each having a cap portion 88, adapted to fit snugly within a closure seat 42 provided in the mold ring 32, and having an outwardly extending post or stem formed with an inner, thicker portion 90, of a diameter adapted to fit relatively snugly within the tube opening 80 but greater than the inner diameter of the lowermost coil 84 of the spring 82. Each post is formed with an outer portion 92, of reduced thickness, defined from the inner portion 90 by a shoulder 94. The outer post portion 92 is of a diameter less than the inner diameter of the coil spring 82 and of the opening 78, and is preferably threaded at its end to receive retaining nuts 96. Each of the posts has its reduced end 92 inserted through the coil spring 82 and through opening 78, and held by its retaining nuts 96 with the outer end of its thicker portion 90 within an opening 80, and with the shoulder 94 against the lowermost coil 84 of the spring 82.

The tubular body 76 is also formed with two pairs of registering, concentric openings, 98 and 100, in the top and bottom walls thereof, respectively, spaced to fit over the guide posts 60 of the strap 10 in position to bring the closure cap portions 88 in register with their seats 42 in the rings 32.

Supported on the upper wall of the tube 76 adjacent each opening 98, on the side facing the detent notch 74 in the adjacent guide post 60, is a block 106, which may be secured in place in any desired manner as by screws and nuts 102 and 104, respectively, passing through such block 106 and the upper and lower walls of the tubular body 76. To each side of the block 106 is pivotally secured one end of a link 108, the other end of which is secured to a latch, consisting of an elongated metal block 110, having a cut-out portion 112, on one side closer to one end thereof, defining a latch toe 114 and a heel 116. The block 106 is disposed with its cut-out side facing the notched side of the guide post 60 and is pivotally secured to the other end of the links 108 closer to the toe 114 thereof, which is disposed in lowermost position. An operating handle 118 is set into the heel end of the block 106.

In operation, the block and its handle are up-ended on the links 108 and moved until the toe 114 thereof underlies the nose 75 of the detent notch 74 of the guide post 60. The handle is then moved downwardly to rotate the latch block 106 on the links 108, so that the toe 114 thereof engages under the nose 75 of the detent recess, exerting pressure on the block 106 which forces the tubular body 76 downwardly towards the strap 10 against the pressure of the spring 82 which, in turn, presses against the shoulder 94 of the closure stem and presses the closure cap portion 88 tightly into its seat 42. The pre-locking position of the latch 110 is shown in Fig. 3, whereas the locking position of the same is shown in Fig. 2 of the drawings.

This completes the description of the mold frame of the present invention. It will be readily apparent that such mold frame is of much simpler construction than similar articles of the prior art, and of lighter weight, and may be much more economically fabricated and more easily and conveniently handled. It will also be apparent that the mold frame construction of the present invention is of greater rigidity and more effective for its purpose, as well as more durable, and that the durability and improved effectiveness of the mold frame assembly is enhanced by the structure of the lock bar, which protects and preserves the springs mounted thereon. It will be additionally apparent that the mold frame assembly of the present invention may be more quickly and easily assembled and more quickly and easily repaired for the replacement of the molds thereon by reason of the means by which the molds are attached to the strap thereof.

It will be further apparent that numerous modifications and variations in the mold frame of the present invention may be made by anyone skilled in the art, in accordance with the principles and practice of the invention hereinabove set forth, and without the exercise of any inventive ingenuity. We desire, therefore, to be protected for any and all such modifications and variations that may be made within the spirit of the present invention and the scope of the claims hereto appended.

What we claim is:

1. A mold frame including, in combination, a mold supporting strap comprising a strip of rigid sheet metal having a central portion and integral reinforcing flanges off-set at right angles thereto along opposed edges thereof, at least one mold opening formed in said central portion, and at least one guide post extending from said central portion, and a closure supporting and locking bar, said bar comprising a tubular body, said tubular body having at least one pair of alined openings formed transversely therethrough adapted to receive a mold closure therein, one of said openings being larger than the other of said openings, a coil spring disposed within said tubular body intermediate and surrounding said alined openings, said coil spring having its terminal coil adjacent said smaller opening larger than said opening and engaging the marginal edge portions thereof, said spring having its coil adjacent said larger opening of greater outer circumference than said larger opening and of lesser inner circumference than said larger opening, and overlapping the edge portions thereof, said tubular body having a second pair of transversely alined openings formed therein adapted to fit over said guide post and arranged to dispose said first pair of openings in concentric register with said mold opening in said strap, and latch means on said tubular body engageable on said lock post for moving said tubular body into closer proximity to said strap and locking the same in its said proximate position to said strap.

2. A mold frame including, in combination, a mold supporting strap comprising a strip of rigid material having a central portion and integral reinforcing flanges off-set at right angles thereto along opposed edges thereof, a plurality of spaced mold openings formed in said central portion, a pair of guide posts extending in an upward direction from said central portion, and a closure supporting lock bar, said lock bar comprising a tubular body of rectangular cross section, said tubular body having a plurality of spaced alined pairs of openings in opposed walls thereof, each of said pairs of openings adapted to receive the stem of a mold closure therethrough, spring means associated with each pair of said openings adapted to engage said mold closure stems, said tubular body having two other pairs of alined openings on said opposed walls thereof, said openings adapted to fit over said guide posts, and cooperating latch means on said tubular body and said posts adapted to interengage said posts for pressing said tubular body over said closure stems into closer proximity to said strap and retaining said tubular body in said proximate position.

3. The combination of claim 2, wherein the lowermost of each pair of said closure stems receiving openings is of greater size than the uppermost thereof, and wherein said spring means associated with each of said pairs of openings comprises a coil spring, said coil spring having its opening at one end greater than the smaller of said pair of openings, and the opening at its other end of lesser size than the larger of said pair of openings, and its outer circumference at said second end greater than said larger opening, said coil spring disposed within said tubular body with its said first end engaging the marginal edge portions of said lesser opening and its said second end engaging the marginal edge portions of said larger opening, and overlapping the same.

4. A mold and frame assembly, including a strap member comprising a strip of rigid sheet material having an elongated central portion and integral reinforcing flanges offset relative thereto along opposed edges thereof, guide posts on one side of said central portion, a plurality of spaced mold openings formed in said central portion in linear arrangement, a mold having an open end, secured to said strap by its open end around each of said mold openings and extending to the other side of said central portion, said open end of said mold including a seat for a mold closure, a closure for each of said molds, said closure including a cap portion adapted to fit within said seat and a stem portion extending upwardly therefrom, means mounting said mold closures for simultaneous movement in and out of said closure seats comprising a tubular body, said tubular body having a plurality of pairs of transversely alined openings formed in the wall thereof, each adapted to slidably receive therein the stem of one of the said mold closures, means retaining said stem in said openings against removal therefrom, resilient means normally maintaining said closure caps in extended relation to said tubular body, alined openings in said body adapted to slide over said guide posts to guide and dispose said closure caps within said closure seats, and means on said tubular body engaging said posts for moving said tubular body thereover into closer proximity to said strap against the pressure of said spring means and locking said tubular body on said posts in said proximate position.

5. The mold and frame assembly of claim 4, wherein each of said molds is provided with a terminal portion at its open end comprising a straight-walled tubular portion having an inwardly offset flange at its inner end forming, with said straight-walled portion, a seat for said closure cap, and an outwardly offset flange at its upper end whereby said mold is secured to said strap, said last flange and said strap having registering openings formed therein, and expansion rivets passed through said openings securing said flange to said strap.

6. The frame and mold assembly of claim 4, wherein the said tubular body is of rectangular cross section and said pairs of openings are formed in opposed walls of said body.

7. The frame and mold assembly of claim 4, wherein said closure stems are each formed with an inner portion of greater diameter than the outer portion thereof, and each pair of stem-receiving openings in said body comprises an opening of lesser diameter than said inner stem portion, and of larger diameter than said outer stem portion, and wherein the other of each of said pairs of openings is of greater diameter than said inner stem portion, and wherein said spring means engages against the shoulder between said inner and outer end stem portions.

8. The frame and mold assembly of claim 4, wherein each of said closure stems comprises an inner portion of relatively greater diameter and an outer portion of relatively lesser diameter, said stem portions defined from one another by a shoulder, and wherein each pair of closure stem-receiving openings comprises a first opening of lesser diameter than said inner stem portion and of greater diameter than said outer stem portion, and the other of each of said pairs of stem receiving openings is of a diameter greater than said inner stem portion, and wherein said spring means comprise a coil spring disposed within said tubular body, said coil spring having one end surrounding and abutting against the marginal edge portions of said lesser opening and its other end engaging against the marginal edge portions partly overlapping the larger of said openings, and adapted to have its overlapping portion engage against said stem shoulder.

9. The frame and mold assembly of claim 4, wherein each of said closure stems comprises an inner portion of relatively greater thickness and an outer portion of relatively lesser thickness, said inner and outer portions defined from one another by a shoulder, and wherein at least one of each pair of said openings is of a size adapted to slidably admit therein said inner stem portion, and wherein said spring means is disposed within said tubular body and engages against said shoulder to resiliently urge said inner stem portion outwardly of said tubular body.

10. A mold closure supporting member for a mold frame assembly, said assembly including a mold supporting strap having a plurality of mold openings and guide posts extending from one side of said strap, said closure supporting member comprising a tubular body having spaced pairs of alined openings formed transversely thereto, each adapted to receive a mold closure stem, guide post receiving openings formed transversely through said tubular body, spring means within said tubular body adjacent each of said pair of closure stem receiving openings arranged to engage a closure stem passed through said openings for resiliently pressing said closures away from said tubular body, and means on said tubular body engageable on said guide posts for pressing said tubular body into closer proximity to said strap and for locking said tubular body in said proximate position.

11. The mold closure supporting member of claim 10, wherein said tubular body is of rectangular cross section and said pairs of openings are formed in opposed walls of said tubular body.

12. The mold closure supporting member of claim 10, wherein said spring means comprises a coil spring disposed within said tubular body, said coil spring having one terminal coil engaging the body wall around one of said pair of openings and having its other terminal coil engage the wall of said tubular body around the other of a pair of openings, and partly overlapping the edges of said last opening.

13. The mold closure supporting member of claim 10, wherein one of each of said pairs of openings is of lesser diameter than the other, and wherein said spring means comprises a coil spring disposed within said tubular body, said coil spring having one terminal coil engaging the body wall around the smaller of the said pair of openings, and having its other terminal coil engaging said tubular body around the larger of said pair of openings and partly overlapping the edge thereof.

14. The mold closure supporting member of claim 10, wherein said tubular body is of rectangular cross section, and wherein said pairs of openings are formed in opposed walls thereof, and wherein one of each pair of said mold stem receiving openings is of lesser diameter than the other, and wherein said spring means comprises a coil spring, said coil spring having one end engaging the body wall around said opening of lesser diameter and having its other terminal coil engage against the marginal edge portions of the other of said pair of openings and overlapping the edge thereof.

References Cited in the file of this patent
UNITED STATES PATENTS

| | | |
|---|---|---|
| 305,564 | Bapterosses | Sept. 23, 1884 |
| 392,133 | Peck | Oct. 30, 1888 |
| 2,298,057 | Kelm | Oct. 6, 1942 |
| 2,574,281 | Olson | Nov. 6, 1951 |
| 2,745,138 | Beattie | May 15, 1956 |
| 2,774,989 | Crammond et al. | Dec. 25, 1956 |